United States Patent Office 3,459,822
Patented Aug. 5, 1969

3,459,822
PREPARATION OF NORMAL MONO-OLEFINS
Herman S. Bloch, Skokie, Ill., assignor to Universal Oil Products Company, Des Plaines, Ill., a corporation of Delaware
No Drawing. Filed Dec. 27, 1966, Ser. No. 604,565
Int. Cl. C07c 11/00, 7/02, 15/02
U.S. Cl. 260—671                                11 Claims The present invention relates to a process for the elimination of a conjugated diolefin from a mixture of a conjugated diolefin and a normal mono-olefin both of which contain at least 9 carbon atoms. In one aspect, the present invention is directed toward a process for the preparation of a relatively conjugated diolefin-free normal mono-olefin from a normal paraffin having at least 9 carbon atoms. And, in another aspect, the present invention is concerned with an improvement in a process for the preparation of an alkylaryl hydrocarbon from an aromatic hydrocarbon and a normal paraffin having at least 9 carbon atoms per molecule.

In the main, the present invention is directed toward the resolution of a substantial contamination problem which almost inevitably attends production of a long-chain normal mono-olefin from a normal paraffin having the same number of carbon atoms. Essentially, this problem involves the undesired concomitant production of a diolefin having the same number of carbon atoms as the desired normal mono-olefin. As such this undesired diolefin tends to have physical properties quite close to those of the desired product, thus making physical separation extremely difficult. For instance, in a process for producing normal nonenes from normal nonane, some nonadienes will inevitably be produced; inasmuch as the boiling points of the nonadienes and of the nonenes overlap, it can be seen that separation by fractional distillation is not feasible. Furthermore, the magnitude of the problem intensifies as the number of carbon atoms increases in the homologues higher than normal nonane. In addition, the chemical characteristics of mono-olefins and diolefins are quite similar, and most ordinary reactions commonly used for separation by chemical means such as halogenation, hydration, esterification, carbonylation, etc., are entered into by both of these compounds. Accordingly, the elimination of the diolefin from the mixture of diolefins and mono-olefins without affecting the mono-olefins, is a difficult problem not readily amenable to conventional solutions. I have now found a method by which the major portion of this problem can be efficiently and effectively solved as will be hereinafter explained; but in order to understand the ramifications of the solution it is necessary to consider in detail how this problem typically arises and what significant improvements flow from its rectification.

Although extensive work has been done in the general area of production of mono-olefins from paraffins, the chief effort in the past has been primarily concentrated on lower molecular weight paraffins (i.e. 2 to 6 carbon atoms). Basically, this was caused by the ready availability of large quantities of these paraffins and, probably, the basic building-block nature of the product olefins. Recently, attention has been focused upon the acquisition of substantial quantities of longer chain olefins. In particular, a need was manifested for normal mono-olefins of 9 to 20 carbon atoms. This need was primarily a consequence of the growing commercial importance of the products that can be made from these normal mono-olefins.

As a consequence of this need, an extensive investigation has been launched into methods of preparation of these long-chain mono-olefins. At the moment the most promising method for their preparation appears to be via dehydrogenation of normal paraffins in contact with a suitable catalyst. Unfortunately, it appears that all suitable dehydrogenation processes produce some conjugated diolefins which can cause problems during subsequent processing of the mono-olefin as will be hereinafter discussed. In particular, a preferred dehydrogenation process involving utilization of a catalytic composite of alumina, platinum, arsenic, and alkali or alkaline earth metals, can produce diolefin in an amount up to 30% by weight of the total olefinic products.

A consideration of the impact of the presence of these diolefins in the mono-olefins must necessarily involve a consideration of the potential uses of these long-chain normal mono-olefins. The principal area of use is in the synthesis of chemical products with particular economic emphasis on detergent products.

Typical products that are readily obtained by conventional means from these long-chain normal mono-olefins are: sulfonated detergents of both the alkali metal alkenylsulfonate and alkylsulfonate salt types and the alkali metal alkylarylsulfonate salt type, non-ionic detergents of both the alkoxypolyalkylene oxide type and the alkylphenoxypolyalkylene oxide type, sulfated detergents of the alkali metal alkylsulfate salt type, detergents of the aniline type such as the polyoxyalkylated alkylanilines, long-chain alcohols, polyesters, polyurethanes, plasticizers. synthetic lube oils. and the like.

In general, these products are manufactured from the normal mono-olefins by reactions which, typically, involve subjecting these mono-olefins to conditions under which it is possible, indeed probable, that any contaminant diolefins will undergo side reactions, such as polymerization to tar-like material. These side reactions typically cause substantial problems in these manufacturing reactions. For instance, in a process of particular commerical interest—one in which a biodegradable alkylaryl hydrocarbon having a straight chain alkyl group of 9 to 20 carbon atoms is prepared—the presence of diolefins in the olefinic charge to the alkylation step of the process necessarily causes the formation of a tar-like material because of the ease of polymerization of the diolefin relative to the mono-olefin. This tar-like material then deactivates the alkylation catalyst by forming a barrier to the approach of the desired reactants. In a preferred process of this type in which the catalyst is an acid-acting fluid, such as hydrogen fluoride, these diolefins enter the acid catalyst phase, polymerize, and effectively dilute the alkylation catalyst as well as reducing its activity by removing a portion of the catalyst in the form of a catalyst-hydrocarbon complex. Moreover, over a period of time this reaction product produced by diolefins can build to substantial levels and form the "acid sludge" that is the bane of this type of alkylation process. In addition, these diolefins can form undesired products such as alkylindanes, alkylindenes, diphenylalkanes, and the like which interfere with subsequent processing, cause substantial quality control problems, and detrimentally affect the yield structure of the desired product.

In short, the presence of these diolefins in the normal long-chain mono-olefins can cause substantial problems in subsequent synthesis work utilizing these hydrocarbons, and these problems flow primarily out of the fact that the diolefins more readily undergo side reactions than the mono-olefins. However, not all diolefins have the same propensity to cause side reactions. In particular, of the three types of diolefins (i.e. cumulated, isolated, and conjugated), it is well known that the ones having the highest reactivity in these side reactions are conjugated diolefins. In fact, the conjugated diolefins typically consititute 50% to 90% of the diolefins formed during the aforementioned dehydrogenation mono-olefin synthesis step. The isolated diolefins do not respond in these side reactions much differently than the mono-olefins; and the cumulated diolefins (i.e. the allenes) possibly because they are highly unstable and readily undergo rearrangement, have not been identified in dehydrogenation product. Accordingly, the chief culprits in the previously mentioned side reactions are conjugated diolefins.

I have now found a method for eliminating these conjugated diolefins from the desired mono-olefins without affecting the normal mono-olefins. It essentially involves a condensation reaction which is selective for these conjugated diolefins and which forms a product, an adduct, which can be easily separated from the long-chain normal mono-olefin if desired.

Consequently, it is one object of the present invention to provide a method for eliminating a conjugated diolefin from a mixture of a conjugated diolefin and a normal mono-olefin both of which have at least 9 carbon atoms. A second object is to provide a combination process for the production of a relatively conjugated diolefin-free normal mono-olefin from a normal paraffin having at least 9 carbon atoms. A third object is to provide an improvement in a combination process for the production of an alkylaryl hydrocarbon, having an alkyl group of at least 9 carbon atoms, from a normal paraffin and a mono-cyclic aromatic hydrocarbon. A fourth object is to provide a method for selectively condensing a long-chain diolefin with a dienophilic compound without affecting a normal mono-olefin that is also present in the reaction environment. A fifth object is to provide a method for reducing the rate of formation of a tar-like material in an alkylation reaction between a long-chain mono-olefin, prepared from the corresponding normal paraffin, and an aromatic compound designed to form a product known in the art as detergent aklylate. A sixth object is to provide a method of reducing the acid consumption in a hydrogen fluoride catalyzed alkylation reaction between a long-chain mono-olefin, prepared from the corresponding normal paraffin, and an aromatic compound.

In one embodiment, the present invention relates to a method for selectively eliminating a conjugated diolefin from a mixture of a conjugated diolefin and of a normal mono-olefin, both of which have at least 9 carbon atoms per molecule. The method essentially involves the contacting of the mixture with a dienophilic compound at condensation conditions effecting adduct formation between the conjugated diolefin and the dienophilic compound, a feature of the method being that the mono-olefin is not disturbed during the conversion of the conjugated diolefin to a higher boiling adduct.

In a second embodiment, the present invention relates to a combination process for the production of a relatively conjugated diolefin-free normal mono-olefin from a normal paraffin hydrocarbon, both of which have at least 9 carbon atoms per molecule. The process comprises subjecting the normal paraffin to catalytic dehydrogenation at conditions effecting production of a normal mono-olefin and a conjugated diolefin, and contacting at least a portion of the resultant dehydrogenation step product with a dienophilic compound at condensation conditions effecting adduct formation between the conjugated diolefin formed in the dehydrogenation step and the dienophilic compound.

In another embodiment, the present invention relates to a process for the preparation of an alkylaryl hydrocarbon from a normal paraffin having at least 9 carbon atoms and an aromatic hydrocarbon. This process consists of the following steps: subjecting the normal paraffin to catalytic dehydrogenation, in a first reaction zone, at dehydrogenation conditions effecting production of a major amount of a normal mono-olefin and a minor amount of a conjugated diolefin; contacting at least a portion of the effluent from the first reaction zone with a dienophilic compound, in a second reaction zone, at condensation conditions effecting adduct formation between the conjugated diolefin and the dienophilic compound; separating the effluent from the second reaction zone into an adduct-containing fraction and a normal mono-olefin fraction; and contacting at least a portion of the normal mono-olefin fraction and a mono-cyclic aromatic hydrocarbon with an acid-acting alkylation catalyst, in a third reaction zone, at alkylation conditions effecting formation of an alkylaryl compound.

Other embodiments of the present invention encompass: particular hydrocarbons that are to be dehydrogenated; characteristics of suitable dehydrogenation and alkylation catalysts; suitable conditions for performing the dehydrogenation, condensation, and alkylation steps; and particularly effective dienophilic compounds for the condensation step, as will be hereinafter described in a detailed discussion of each of these facets of the present invention.

Although the present invention gives beneficial results when applied to a mixture of normal, long-chain mono-olefins and conjugated diolefins obtained from any suitable source, it more typically is applied to such a mixture produced by dehydrogenating a normal paraffinic hydrocarbon. As previously explained, this application is more common because of the inevitable production of some diolefin during this dehydrogenation. Moreover, for a preferred dehydrogenation process, this problem of contamination by diolefins tends to be quite significant. Therefore, the combination of the present conjugated diolefin elimination step and a dehydrogenation step serves to alleviate this conjugated diolefin contamination problem.

With respect to this dehydrogenation step, suitable charge stocks are normal paraffins of at least 9 carbon atoms and especially 9 to about 20 carbon atoms. Representative members of this class are: nonane, decane, undecane, dodecane, tridecane, tetradecane, pentadecane, hexadecane, heptadecane, octadecane, mixtures thereof, and the like. Of particular significance to the present invention are normal paraffins of about 10 to about 15 carbon atoms since these easily produce monoolefins which can be utilized to produce biodegradable detergents. Moreover, in some cases, it is advantageous to charge to the dehydrogenation step, a mixture of normal hydrocarbons such as the normal paraffin extract stream obtained when petroleum fractions in the $C_9$ to $C_{20}$ boiling range are subjected to a selective molecular sieve adsorption process such as the "U. O. P. Molex" process.

Suitable catalysts for use in the dehydrogenation zone of the present invention generally comprise one or more metallic components selected from Groups VI and VIII of the Periodic Table, and compounds thereof. Such catalysts are generally composited with a carrier material which generally consists of one or more refractory inorganic oxides selected from the group of alumina, silica, zirconia, magnesia, and the like. It is particularly important that the catalyst employed does not promote isomerization of the normal paraffins or of the resultant olefinic product. Accordingly, the catalyst utilized is preferably made non-acidic by compositing it with one or more alkali metals or alkaline earth metals. Furthermore, the conversion to the desired mono-olefin is enhanced when the noble metals of Group VIII are employed with platinum being particularly preferred.

Insofar as degree of conversion and avoidance of side reactions are concerned, a particularly preferred catalyst for the dehydrogenation step comprises an alumina component, a platinum group metallic component, an alkali or alkaline earth metal component and a component selected from the group consisting of arsenic, antimony, bismuth, and compounds thereof.

The alumina component of this preferred dehydrogenation catalyst generally has an apparent bulk density less than about 0.50 gram/cc. with a lower limit of about 0.15 gram/cc. The surface area characteristics are such that the average pore diameter is about 20 to about 300 Angstroms; the pore volume is about 0.10 to about 1.0 milliliter per gram; and the surface area is about 100 to about 700 square meters per gram. It may be manufactured by any suitable method including the well-known alumina sphere manufacturing procedure detailed in U.S. Patent No. 2,620,314.

The alkali component of this preferred dehydrogenation catalyst is selected from both alkali metals—cesium rubidium, potassium, sodium and lithium—and the alkaline earth metals—calcium, magnesium, and strontium with lithium being preferred. It is present in an amount, based on the elemental metal, less than about 5% by weight of the total composite with a value in the range of 0.01% to about 1.5% generally being most preferred. In addition, the alkali component may be added to the alumina in any suitable manner, especially in an aqueous impregnation solution thereof, and thus suitable compounds are the chlorides, sulfates, nitrates, acetates, carbonates, etc., such as lithium nitrate. It may be added either before or after the other components are added, or during alumina formation—for example, to the alumina hydrosol before the alumina carrier material is formed.

The Group VIII component is generally selected from the group of palladium, iridium, ruthenium, rhodium, osmium, and platinum—with platinum giving best results. It is used in a concentration, calculated as an elemental metal, of about 0.05% to about 5.0% by weight of the catalytic composite. This component may be composited in any suitable manner with impregnation by a water soluble compound, such as chloroplatinic acid, being especially preferred.

The fourth component of this preferred dehydrogenation catalyst is selected from the group consisting of arsenic, antimony, bismuth, and compounds thereof. Arsenic is particularly preferred. This component is present in an atomic ratio to the Group VIII metallic component of from about 0.1 to about 0.8. Intermediate concentrations are preferably employed such that the atomic ratio is about 0.2 to about 0.5. This component can be composited in any suitable manner—a particularly preferred way being via a water soluble impregnation solution such as arsenic pentoxide, etc.

This preferred catalytic composite is thereafter typically subjected to conventional drying and calcination treatments at temperatures in the range of 800° F. to about 1100° F.

Although acceptable results are obtained when the dehydrogenation step is performed at a temperature in the range of about 400° C. to about 600° C., it is preferred to operate within the range of about 430° C. to about 530° C. Similarly, pressure can be within the range of about 10 p.s.i.g. to 100.0 p.s.i.g., with best result obtained in the range of about 15.0 to about 40.0 p.s.i.g. Likewise, a liquid hourly space velocity (LHSV—volume of equivalent liquid charge per hour per space volume of catalyst disposed within the reaction zone) of from above about 10.0 to about 40.0 is preferably utilized.

In some cases it may be advantageous to utilize a diluent, such as steam, methane, carbon dioxide, benzene, toluene, etc., in order to control the exothermic heat of reaction, or to adjust the partial pressure of hydrogen in the reaction zone, or to control carbonaceous deposits on the catalyst.

Although the presence of hydrogen in the dehydrogenation zone is not essential for all dehydrogenation catalysts and diluents previously mentioned, it is preferably present when the preferred catalyst is utilized in order to aid in controlling the rate of carbonaceous deposit formation on the catalyst. This hydrogen can be once-through hydrogen or recycle hydrogen. However, since the dehydrogenation reaction produces a surplus of hydrogen, it ordinarily is obtained by separating a hydrogen-rich gas from the effluent from the dehydrogenation zone and recycling it through compressive means to the dehydrogenation zone. Furthermore, this hydrogen is typically present in an amount such that the ratio of mols of hydrogen to mols of paraffin is about 1 to about 20 with the preferred value in the range of about 5 to about 15.

It is to be emphasized at this point that the effluent from the dehydrogenation zone when the preferred catalyst is employed can contain diolefins up to 30% by weight of the total olefinic product. As mentioned hereinbefore, of these approximately 75% by weight will be conjugated. Thus, it is evident that, with the preferred dehydrogenation catalyst, a substantial diolefin contamination problem can exist. And these results are typical of the situation encountered with other dehydrogenation catalysts.

In any event, at least a portion of the dehydrogenation zone effluent is, in accordance with the present invention passed to a condensation zone. In this zone, the condensation step of the process is performed by contacting the effluent stream with a dienophilic compound at adduct formation conditions. Moreover, it is to be noted that it is within the scope of the present invention that a mixture of mono-olefins and conjugated diolefins derived from any other suitable source can also be charged to this condensation step.

Suitable dienophiles for use in the present invention are mono-olefins having from 2 to 6 carbon atoms per molecule. Although these olefins may be unsubstituted, they are particularly effective when their double bond is conjugated with at least one strongly electron-attracting group such as: the carbonyl group, the carboxylic groups, the cyano group, etc. Examples of these dienophiles are: maleic anhydride, acrolein, cinnamaldehyde, crotonic acid, cinnamic acid, acrylic acid, acrylonitrile, crotonaldehyde, tetracyano ethylene, dimethylmaleate, quinone, etc. On the other hand, the unsubstituted olefins—such as ethylene, propylene, etc.—even though they are not as active, will react and are very attractive because of economic considerations. Balancing these factors I have concluded that the preferred dienophile is ethylene.

The dienophilic compound may be present in any suitable concentration effecting adduct formation with substantially all of the conjugated diolefins. It is preferred to utilize the dienophilic compound in an amount sufficiently greater than the minimum stoichiometric amount so that the reaction is forced to go substantially to completion. In the case of relatively slow reacting dienophiles, such as ethylene, it is thus preferred to utilize the dienophilic compound in an amount greater than 5 or more times the minimum stoichiometric amount. On the other hand, with more rapidly reacting dienophiles, such as maleic anhydride, the excess over the stoichiometric amount is generally much smaller. In any event, the excess dienophilic compound can be recovered and recycled to the condensation zone by conventional means.

Suitable reaction conditions for this condensation reaction are as follows: a temperature in the range of about 25° C. to about 200° C., a pressure such that the major portion of the reactants are in the liquid phase—that is to say from about atmospheric up to about 75 atmospheres or more, and a residence time of the diolefins in the condensation zone of from about 1 to about 30 hours. Moreover, it is important to note that the condensation reaction does not require a catalyst.

In view of the fact that the resultant adduct contains at least 2 more carbon atoms and is a cyclo-olefin, it can, if desired, be easily separated from the condensation zone effluent. One suitable method, if polar dienophiles are used, is solvent extraction, since the cyclo-olefinic adducts are selectively dissolved from a mixture with the paraffins and mono-olefins by solvents such as the oxynitriles, the glycols, the phenols, and other polar selective solvents. A preferred method, particularly with substituted dienophiles, is fractional distillation. It is to be noted that in some cases (for example, if the dienophile is ethylene) it is not necessary to separate the resultant adducts from the condensation zone effluent, because the adducts do not ordinarily cause the polymerization problem previously mentioned during subsequent processing. This is particularly true if the subsequent process is at a temperature substantially less than that employed in the condensation zone.

In some situations, particularly when employing an expensive dienophilic compound, it may be desirable after separation of the condensation zone effluent to subject the adduct-containing portion to conditions designed to reverse the adduct-formation reaction and, thus, allow the recovery and recycling of the dienophilic compound. The chief condition promoting this reverse reaction is temperature; and when the adduct-containing portion of the effluent from the condensation step is subjected to a temperature significantly above that employed in the condensation zone, the condensation reaction tends to reverse. In a similar vein, it is important that any procedure employed to separate the adduct from the normal mono-olefin be conducted at a temperature significantly less than that employed in the condensation zone. For some hydrocarbon mixtures this last requirement may require separation techniques, such as vacuum distillation, that are familiar to those skilled in the art.

It is to be observed that if recovery of the dienophilic compound is undertaken, there will also be available substantial quantities of relatively pure conjugated diolefinic hydrocarbons as a side product of the recovery operation. These may be utilized for any purpose in which relatively high molecular weight hydrocarbons containing conjugated unsaturation are desired. For example, these compounds are useful in the preparation of drying oils which may be incorporated in the manufacture of paints and varnishes in which unsaturated glyceride oils are now employed.

It is to be noted that the effluent from the condensation zone, either before or after the adduct separation step, is relatively free of conjugated diolefins (i.e. relative to the input stream to the condensation zone) and is, accordingly, referred to herein as a relatively conjugated diolefin-free normal mono-olefin stream. In point of fact, depending on the particular dienophilic compound chosen, it will have been reduced in conjugated diolefin content by about 75% to 95% of the conjugated diolefins originally present in the input stream to the condensation zone.

Considering the fact that unreacted paraffin hydrocarbons are relatively inert to the conditions under which the mono-olefins will subsequently be utilized, it is generally not necessary to separate them from the desired mono-olefin. On the other hand, in some cases it may be necessary to have a concentrated mono-olefin stream available. In this latter situation, the unreacted paraffins can be separated from the normal mono-olefins, either before or after the condensation step of the present invention, by methods well known in the art such as selective adsorption on activated charcoal, silica gel, alumina, molecular sieves, etc., or absorption in a chelating reagent such as ammoniacal cupric salt solution.

In any event, in an embodiment in which the present invention manifests a particularly significant advantage (i.e. it promotes process stability by reducing the formation of acid sludge or of a tar-like carbonaceous deposit), the relatively conjugated diolefin-free normal mono-olefin is charged with an aromatic hydrocarbon to an alkylation zone. As pointed out hereinbefore, this mono-olefin stream may be one that is reasonably free of any unreacted paraffin from the dehydrogenation zone; but it is preferred to utilize the mono-olefin with the unreacted paraffin since the latter acts as an inert diluent which is useful for heat control purposes in the exothermic alkylation reaction. Furthermore, since the alkylation reaction converts olefins into higher boiling substances it, in effect, can be thought of as a means of quickly and efficiently performing the desired separation. These paraffins are, consequently, easily separated from the alkylate and recycled to the dehydrogenation zone, if desired, after suitable treatment to insure that the acidity of the paraffin stream is reduced to very low levels. The term "acidity" referred to herein is any material such as combined halogen, combined oxides of sulfur, etc. which might be present in the effluent from the alkylation zone and be acid-acting in the dehydrogenation zone.

Of the aromatic hydrocarbons suitable for use in the alkylation reaction with the normal mono-olefin, I prefer to utilize a mono-cyclic benzene hydrocarbon containing no more than two alkyl substituents. Preferably, neither of the alkyl groups is of greater chain length than the ethyl radical. Hence, benzene, toluene, xylenes, methylethylbenzene, and diethylbenzene are preferred aromatics for use in the alkylation zone. Moreover, in some cases it may be desirable to utilize phenol, cresol, acetanilide, etc. Thus, any alkylatable aromatic compound containing a substitutable hydrogen atom on a benzene nucleus may be used if desired.

In the alkylation step of the present invention, the aromatic compound and the relatively conjugated diolefin-free mono-olefin may be introduced simultaneously or in admixture with each other into the alkylation zone containing the desired alkylation catalyst; alternatively, the aromatic compound may be contacted with the alkylation catalyst followed by the addition of the mono-olefin thereto. The molecular proportion of aromatic compound to mono-olefin is generally maintained above equimolecular ratio, preferably from about 2 to 1 to about 30 to 1 in order to minimize polyalkylation of the aromatic compound and polymerization of the olefin. Moreover, the feed stream will most likely be cooled to meet desired temperatures as mentioned hereinafter.

Any suitable alkylation catalyst may be utilized to effect the desired reaction. Representative of these are: sulfuric acid of at least 85% concentration and preferably higher; substantially anhydrous hydrogen fluoride, generally not containing more than 10% water; anhydrous aluminum chloride or aluminum bromide, preferably in the presence of the corresponding hydrogen halide; boron trifluoride either with or without addition of hydrogen fluoride, and either as such or adsorbed on a solid support, such as a boron trifluoride-modified inorganic base; phosphoric acid which is generally deposited on a carrier material such as kieselguhr, hydrated silica, etc.; and the like. The preferred catalyst for the present invention is hydrogen fluoride of from about 90% concentration or higher; another preferred catalyst is the previously mentioned boron trifluoride.

Details as to concentration, method of use, etc. of these preferred catalysts will be found in the teaching of U.S. Patent No. 3,249,650 insofar as the hydrogen fluoride catalyst is concerned, and in the teaching of U.S. Patent No. 3,200,163 for the boron trifluoride catalyst.

In the alkylation zone, the reactants are maintained in contact with the alkylation catalyst for a reaction period of about 5 to about 100 minutes, the exact contact time being dependent on the relative ease of alkylating the reactants. The temperature maintained in this zone is within the range of about 0° C. to about 100° C. and preferably from about 30° C. to about 75° C. Likewise, superatmospheric pressure sufficient to maintain the catalyst and hydrocarbon in liquid phase are generally employed. The exact process conditions may be selected within the aforesaid ranges, with the final determination being made as a function of the characteristics of the particular reactants and catalyst chosen, as is well known by those skilled in the art.

Following the alkylation reaction, the alkylation zone effluent is generally separated by a fractionating system in order to obtain the desired alkylaryl hydrocarbon. In a representative case of particular interest in which the catalyst is a solution of hydrogen fluoride and an aromatic hydrocarbon is selected for alkylation, the effluent is passed to a separating zone in which an acid phase separates from a hydrocarbon phase. The hydrocarbon phase is then washed with acid and stripped of hydrogen fluoride. The hydrogen fluoride-free hydrocarbon phase is thereafter charged to a fractionating system in order to recover the excess moles of unreacted aromatic hydrocarbon and to separate out the paraffin diluent that, in one preferred embodiment, is present due to the charging of both the unconverted paraffins and mono-olefins from the dehydrogenation step. Ordinarily, the recovered unreacted aromatic hydrocarbon will be recirculated to the alkylation zone and the recovered paraffin will be recycled to the dehydrogenation zone after suitable treatment to remove acid-acting components. The desired product stream is generally recovered as an overhead fraction from this fractionating system and is, either before or after recovery passed thru suitable defluorination equipment, such as a calcined bauxite bed, in order to remove any combined fluoride.

The acid phase from the separating zone ordinarily contains a complex mixture of hydrocarbons and hydrofluoric acid known in the art as "acid sludge." This, as previously mentioned, is at least in part the result of the presence of conjugated diolefins that enter the catalyst phase, polymerize, and effectively dilute the alkylation catalyst as well as reduce its activity by removing a portion of the catalyst in the form of a catalyst-hydrocarbon complex. The formation of this sludge requires frequent addition of fresh catalyst to the alkylation zone and frequent regeneration of the catalyst to remove this sludge before the catalyst phase is recycled to the reactor. Accordingly, it is a feature of the present invention that the formation of this sludge is minimized, consequent acid consumption is lower, and regeneration requirements are substantially reduced.

The product alkylate obtained from the alkylation zone constitutes the raw material or starting stock for the preparation of many well known products. Typical of these are the detergents or surface active products. Thus, a highly effective biodegradable detergent is prepared from an alkyl aromatic hydrocarbon by sulfonating it to produce the sulfonic acid derivative which is preferably neutralized with an alkaline, salt-forming base, such as sodium hydroxide, to form a water-soluble alkylaryl sulfonate detergent. The akylate may also be nitrated to form a nuclear substituted mono-nitro derivative which is thereafter catalytically reduced to the mono-amino-substituted analog (e.g., an alkylaniline, an alkyltoluidine, etc.). This amine is thereafter condensed with ethylene oxide or propylene oxide to introduce the hydrophilic polyoxyalkylene group on the amino nitrogen atoms, forming thereby the corresponding polyoxyalkylated detergent product. In the case of the phenol, the cresol, and the xylenol alkylates, these are converted directly to detergents via oxyalkylation with ethylene or propylene oxide.

The following examples are introduced to illustrate further the novelty, mode of operation, and utility of the present invention, and the benefits to be derived through the utilization thereof. It is not intended to limit unduly the present invention to the flow scheme, specific process condition, types of catalyst, and composition of catalyst used therein since they are intended to be illustrative rather than restrictive.

Example I

This example demonstrates the capability of the present invention to produce a relatively conjugated diolefin-free mono-olefin from a normal paraffin feed stock.

The working embodiment of the present invention utilized in this example consists of a dehydrogenation zone in which is employed the hereinbefore described preferred dehydrogenation catalyst, coupled with a condensation zone in which ethylene is utilized to remove undesired conjugated diolefins generated in the dehydrogenation zone.

The catalytic composite, employed in the dehydrogenation zone, is disposed in a stainless-steel tube and is buffered by a zone of alpha-alumina particles placed on the input side of the reactor. The heat of reaction is supplied by an inner spiral preheater located in the input line to the reactor section. The catalyst employed in the reactor zone is manufactured from a commercially available alumina carrier material by impregnting it with chloroplatinic acid and lithium nitrate at conditions effecting the incorporation of 0.75% by weight of platinum and of 0.50% by weight of lithium (n.b. both of these calculated on an elemental basis). Thereafter, an ammoniacal solution of arsenic pentoxide is utilized to impregnate arsenic in a manner incorporating 0.3 atom of arsenic for each atom of platinum. The resultant composite is then dried at a temperature of about 210° F. and calcined for approximately two hours.

A charge stock containing 99.9% by weight of normal dodecane is charged to the dehydrogenation zone in admixture with recycle hydrogen. The effluent from the dehydrogenation zone passes thru cooling means to a separating zone. Here a hydrogen-rich gas phase separates from a liquid phase and it is recycled through compressive means to the inlet to the dehydrogenation zone. The liquid phase is thereafter passed to a condensation zone wherein it is contacted with an ethylene-rich gas stream. The liquid effluent from the condensation zone is passed to a vacuum fractionating zone from which a relatively diolefin-free normal dodecene-dodecane fraction is taken overhead and an adduct-containing bottoms fraction is recovered.

Operating conditions employed in this process are: (1) for the dehydrogenation zone, a LHSV of 32, a ratio of moles of hydrocarbon to moles of dodecane of 8, an inlet pressure of 22 p.s.i.g., and an inlet temperature of 455° C; and (2) for the condensation zone, a temperature of 200° C., a pressure such that the $C_{12}$ portion of the charge stays substantially liquid and a high concentration of ethylene is maintained (i.e. approximately 60 atmospheres), a contact time of about 10 hours, and a ratio of moles of ethylene to moles of conjugated diolefin of about 15.

An analysis of the liquid effluent from the dehydrogenation zone show the following composition: 88.2% by weight unreacted normal dodecane, 10.7% by weight of normal dodecenes, 0.5% by weight of normal dodecadienes, and 0.6% of aromatics and other products. This implies that the selectivity for the desired mono-olefin is 91% and the corresponding diolefin production is 4.5% of the total olefinic product. The diolefins are approximately 75% by weight conjugated.

At this point it is to be noted that the preferred dehydrogenation catalyst has the singular capability to retard the formation of both diolefins and aromatics due to a hypothesized inhibiting effect of the arsenic component on the platinum dehydrogenation and dehydrocyclization function; for other prior art dehydrogenation processes the corresponding diolefin production would be greatly increased. Nevertheless, 4.5% diolefin is still enough to cause problems during subsequent processing as hereinafter discussed.

An analysis of the overhead fraction from the vacuum distillation column is also made. It shows that the dodecadiene concentration is reduced to a level of less than 1.4% which corresponds to a reduction in the diolefin concentration in the total olefinic product of approximately 70%. Moreover, this analysis shows that of the remaining diolefins only about 20% are conjugated diolefins.

Hence, this example manifests the significant reduction of diolefin content that is achieved by the present invention through the use of a preferred dehydrogenation catalyst coupled with a conjugated diolefin elimination procedure.

It is to be emphasized that if, in the present example, means were employed to separate the olefinic product from the unreacted paraffin and this unreacted paraffin was recycled to the dehydrogenation zone, the diolefin formation problem would most likely be magnified since the separation, even at best, could not be made completely effective. Accordingly, some mono-olefin would be carried back to the dehydrogenation zone where it would have a significant probability of being converted to a diolefin. Consequently, the present invention, in this embodiment, would be very advantageously employed.

Example II

This example indicates the improvement that attends employment of the present invention in an alkylation embodiment.

Two separate cases are considered here. The first, Case A, involves a dehydrogenation zone and hydrogen separating zone, substantially as described in Example I, with the liquid effluent from the separating zone directly flowing through cooling means to an alkylation zone. This flow scheme represents prior art process in which no direct attempt is made to control conjugated diolefin concentration in the feed stream to the alkylation zone. The second, Case B, involves the total flow scheme as described in Example I with the relatively conjugated diolefin-free mono-olefin, that is taken overhead from the vacuum distillation column, being fed through suitable cooling means to the alkylation zone.

The feed to the dehydrogenation zone and the operation of the dehydrogenation zone are the same for both cases and are as given in Example I. Furthermore, the alkylation zone in both cases is operated in exactly the same manner. That is to say the olefin-containing stream is, in both cases, admixed with a benzene stream in such a proportion that the ratio of moles of benzene to moles of olefin contained in the olefinic charge stream is 10. In addition, anhydrous hydrogen fluoride is introduced into the alkylation zone in an amount such that the volumetric ratio of catalyst to hydrocarbon entering the alkylation zone is about 1.5. The alkylation zone is operated at a temperature of 100° F., a pressure of 250 p.s.i.g., and a space time (i.e. defined as the time of contact of the hydrocarbon with the catalyst in the alkylation reactor—it is usually calculated on the basis of the total volume of catalyst in the reactor divided by the volume rate of hydrocarbon charge) of 15 minutes. The reactor is also provided with suitable cooling means to remove the exothermic heat of reaction and to maintain the desired temperature.

The alkylation zone effluent is then passed to a separating zone in which an acid phase separates from a hydrocarbon phase. At least a portion of the acid phase from the separator is passed to and acid regenerator which is a small distillation column. It is operated with a low amount of reflux and at a pressure of approximately 150 p.s.i.g. Taken overhead from this regenerator column is a hydrogen fluoride stream which is recirculated to the process. A tar-like acid sludge material is recovered as bottoms. As explained hereinabove this acid sludge is, at least in part, the result of polymerization of conjugated diolefins in the feed and the formation of a catalyst-hydrocarbon complex. This acid sludge formation results in an increase in the amount of alkylation catalyst converted to spent catalyst sludge.

Referring back to the hydrocarbon phase of the alkylation zone effluent, it is subsequently heated and charged in succession to an acid wash column and a hydrogen fluoride stripper. The overhead vapor from the stripper is recirculated to the alkylation zone. The bottoms from the stripper are then charged to a fractionation system from which unreacted normal benzene, dodecane, and dodecylbenzene are principally obtained.

The quantity of acid in the system is maintained at constant levels, and the rate at which the acid is replenished forms a measure of the rate at which the undesired acid sludge is being formed. In Case A, it is necessary to regenerate the catalyst at a rate which is three times greater than for Case B. Further, the rate of addition of fresh make-up acid (chiefly to replenish that lost during regeneration) is about in the same ratio. That is to say, Case A requires approximately 0.3 pound of fresh hydrogen fluoride per barrel of alkylate product, whereas Case B requires about 0.1 pound of hydrogen fluoride on the same basis. Furthermore, the yield structure for Case B, as well as benzene consumption, is improved over Case A inasmuch as the yield of undesired products such as diphenyldodecane is greatly reduced.

I claim as my invention:

1. A method for eliminating a conjugated diolefin from a mixture of a conjugated diolefin, having at least 9 carbon atoms, and of a normal mono-olefin, having at least 9 carbon atoms, which comprises contacting said mixture with ethylene at condensation conditions effecting adduct formation between said conjugated diolefin and said ethylene.

2. The method of claim 1 further characterized in that said mixture is at least a portion of the effluent from a dehydrogenation zone in which a normal paraffin, having from about 9 to about 20 carbon atoms, is subjected to catalytic dehydrogenation.

3. The method of claim 1 further characterized in that said condensation conditions include a temperature in the range of about 25° C. to about 200° C.

4. The method of claim 1 further characterized in that said normal mono-olefin is thereafter separated from said adduct by fractional distillation.

5. A process for the preparation of an alkylaryl compound, having at least 9 carbon atoms in the alkyl side chain, from a normal paraffinic hydrocarbon of at least 9 carbon atoms and a mono-cyclic aromatic hydrocarbon, which comprises the steps of:
  (a) subjecting said normal paraffinic hydrocarbon to catalytic dehydrogenation, in a first reaction zone, at dehydrogenation conditions effecting the production of a normal mono-olefin and a conjugated diolefin;
  (b) contacting a least a portion of the effluent from said reaction zone with ethylene, in a second reaction zone, at condensation conditions effecting adduct formation between said conjugated diolefin and said ethylene;
  (c) separating the effluent from said second reaction zone into an adduct-containing fraction and a normal mono-olefin-containing fraction; and
  (d) contacting at least a portion of said normal mono-olefin-containing fraction and said mono-cyclic aromatic hydrocarbon with an acid-acting alkylation catalyst, in a third reaction zone, at alkylation conditions effecting formation of an alkylaryl compound.

6. The process of claim 5 further characterized in that at least a portion of the effluent from said third reaction zone is separated into a normal paraffin-containing fraction, a mono-cyclic aromatic-containing fraction and an alkylaromatic fraction.

7. The process of claim 6 further characterized in that said normal paraffin-containing fraction is recycled to said first reaction zone.

8. The process of claim 6 further characterized in that said mono-cyclic aromatic-containing fraction is recycled to said third reaction zone.

9. The process of claim 5 further characterized in that the catalyst utilized in said first reaction zone is a composite of an alumina component, a component selected from the group consisting of alkali metals, alkaline earth metals and compounds thereof, a component selected from the group consisting of arsenic, bismuth, and compounds thereof, and a Group VIII metallic component.

10. The process of claim 5 further characterized in that said acid-acting alkylation catalyst is hydrogen fluoride.

11. The process of claim 5 further characterized in that said mono-cyclic aromatic hydrocarbon is benzene.

References Cited

UNITED STATES PATENTS

| 3,312,734 | 4/1967 | Jones | 260—677 |
| 3,347,948 | 10/1967 | Featherstone | 260—677 |

FOREIGN PATENTS

| 950,975 | 3/1964 | Great Britain. |

DELBERT E. GANTZ, Primary Examiner

CURTIS R. DAVIS, Assistant Examiner

U.S. Cl. X.R.

260—677